May 8, 1962 G. E. ATKINSON 3,033,252
AIR PASSAGE MEANS FOR RECIPROCATING SAW
Filed Sept. 15, 1960 2 Sheets-Sheet 1
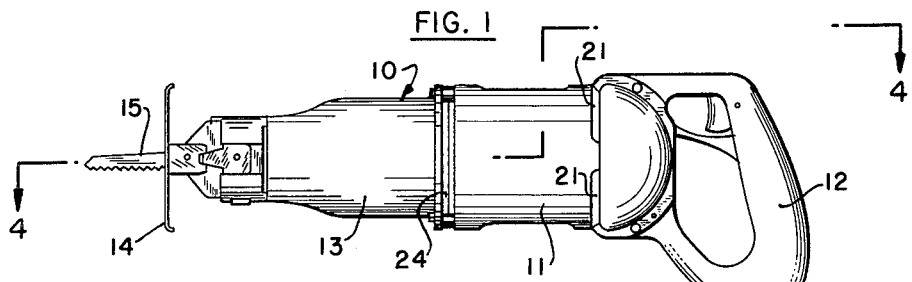
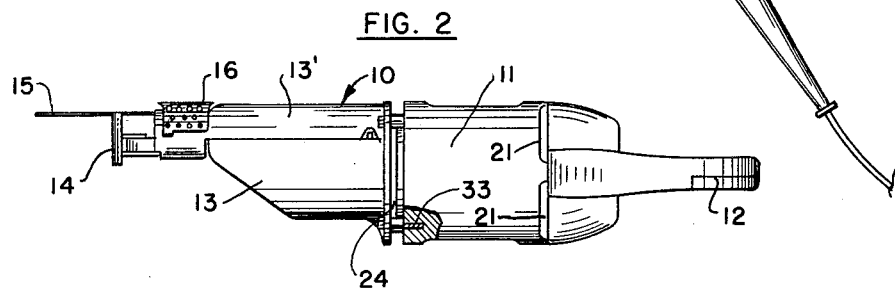
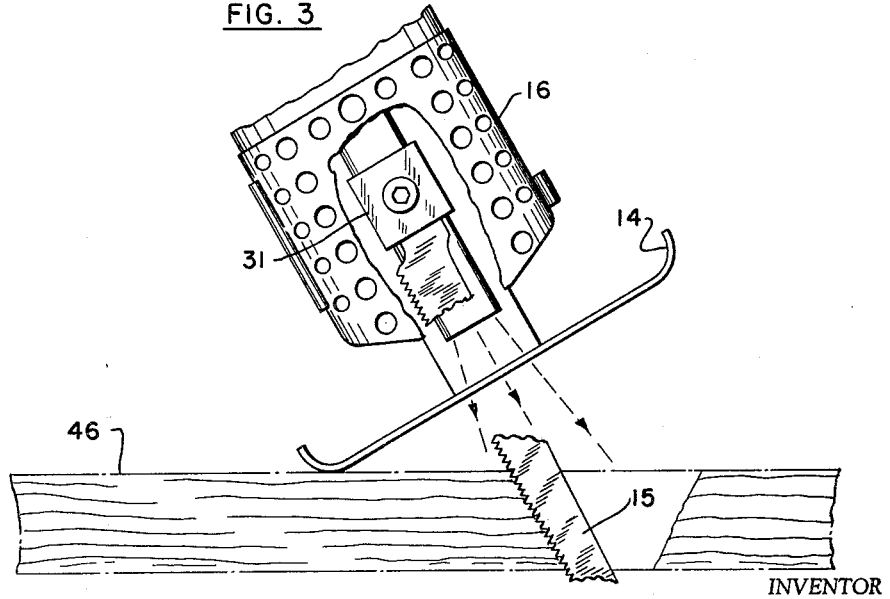
INVENTOR
GEORGE E. ATKINSON
BY *Leonard Bloom*
ATTORNEY May 8, 1962   G. E. ATKINSON   3,033,252
AIR PASSAGE MEANS FOR RECIPROCATING SAW
Filed Sept. 15, 1960   2 Sheets-Sheet 2
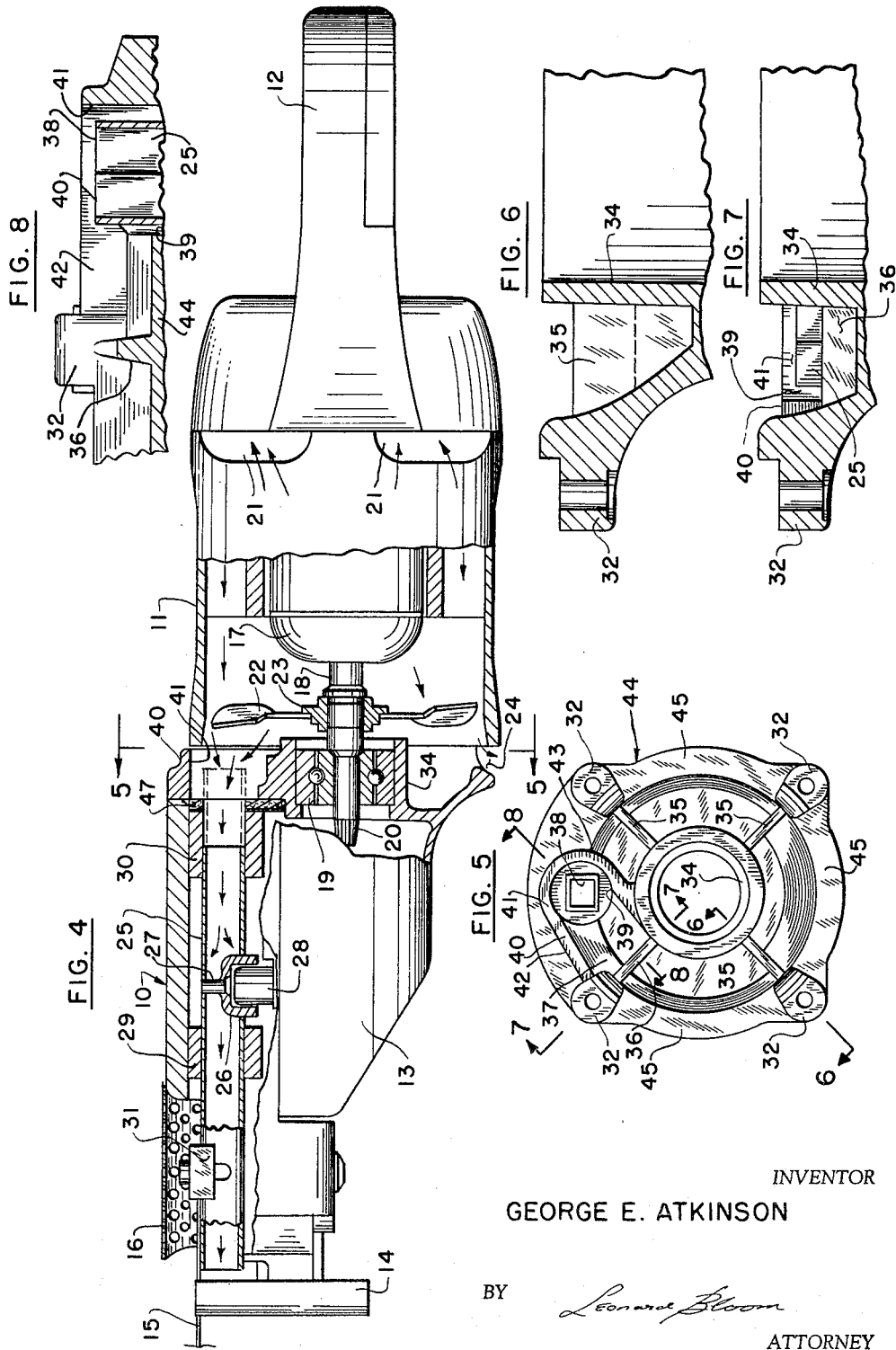
INVENTOR
GEORGE E. ATKINSON
BY *Leonard Bloom*
ATTORNEY 3,033,252
**AIR PASSAGE MEANS FOR RECIPRO-
CATING SAW**
George E. Atkinson, Linthicum Heights, Md., assignor to
The Black and Decker Manufacturing Company, Towson, Md., a corporation of Maryland
Filed Sept. 15, 1960, Ser. No. 56,139
4 Claims. (Cl. 143—157)

The present invention relates to air passage means for a reciprocating saw, and more particularly, for a power-operated saw having a hollow or tubular reciprocating shaft.

It is an object of the present invention to provide means whereby a portion of the discharged cooling air is diverted down through the tubular reciprocating shaft.

It is a further object of the present invention to provide means including an air scoop whereby a portion of the discharged air is diverted down through the tubular reciprocating shaft.

It is still a further object of the present invention to provide means whereby the chips and dust particles are blown away from the kerf of the saw blade by an air stream passing down through the tubular reciprocating shaft.

It is yet another object of the present invention to provide cooling means for the tubular reciprocating shaft and for the conventional yoke secured thereto.

These and other objects of the present invention will become apparent from the reading of the foregoing specification taken in conjunction with the enclosed drawings, in which:

FIGURE 1 is a side elevational view of a power-operated reciprocating saw in which the techniques of the present invention may be utilized;

FIGURE 2 is a top plan view;

FIGURE 3 is an enlarged view of the forwardmost portion of the power-operated reciprocating saw, showing a typical pocket cut being made into the work, and further showing the means by which the air stream blows away the dust particles and other chips normally generated in the sawing operation;

FIGURE 4 is an enlarged sectional view taken along the lines 4—4 of FIGURE 1;

FIGURE 5 is a sectional view taken along the lines 5—5 of FIGURE 4;

FIGURE 6 is an enlarged view taken along the lines 6—6 of FIGURE 5;

FIGURE 7 is an enlarged view taken along the lines 7—7 of FIGURE 5; and

FIGURE 8 is an enlarged view taken along the lines 8—8 of FIGURE 5.

In accordance with the teachings of the present invention, a power-operated reciprocating saw is provided having a motor housing and further having a gear case secured forwardly of the motor housing; and in conjunction with such a reciprocating saw, air passage means are provided so as to divert a portion of the discharged air down through the tubular reciprocating shaft of the saw. The motor housing may contain a motor having an armature shaft, and a fan is mounted on the armature shaft forwardly of the motor. Ventilating slots are located in the motor housing rearwardly of the motor, and air discharge openings are provided adjacent to the fan and between the motor housing and the gear case. The gear case houses a reciprocating tubular shaft having a rearmost open end, and means including an air scoop are provided to divert a portion of the discharged air down through the tubular shaft.

With particular reference to FIGURES 1 and 2, there is illustrated a power-operated reciprocating saw 10 with which the teachings of the present invention may find particular utility. The reciprocating saw 10 includes a motor housing 11, a switch handle 12, a gear case 13, a gear case cover 13, a shoe 14, a blade 15 and a guard 16. Such a power-operated reciprocating saw 10 is usually deemed in the art as a "sabre saw" and is useful for a variety of purposes, such as the making of a series of pocket cuts in heavy-duty high-speed applications; but naturally, it will be appreciated that the teachings of the present invention may also be utilized in a variety of power-operated reciprocating cutting tools, other than the specific illustration of the sabre saw 10.

With particular reference to FIGURE 4, there is illustrated an enlarged sectional view of the sabre saw 10, which includes in the motor housing 11 a suitable electric motor 17 having an armature shaft 18 mounted in a ball bearing 19. Armature shaft 18 has a pinion 20 formed on its extremity so as to engage and drive conventional motion-translating means (partially omitted for ease of illustration) to ultimately cause the blade 15 to be reciprocated. The motor housing 11 contains a series of circumferentially-spaced ventilating slots 21 by means of which cooling air may be drawn through the motor housing 11 as depicted by the series of small arrows. A fan 22 has its hub 23 securely mounted upon a portion of the armature shaft 18, and the fan 22 provides the suction means by which the air is drawn from the outside through the motor 17 to be discharged partially through one or more air discharge openings 24, the latter being formed adjacent to the fan 22 (see FIGURE 4) and between the motor housing 11 and the gear case 13, as illustrated in FIGURES 1 and 2.

The sabre saw 10 also includes a tubular (or hollow) reciprocating shaft 25 having a transverse yoke 26 secured thereto by means of a rivet 27; and the yoke 26 is driven by means of an eccentric pin (denoted generally at 28), it being appreciated that the motion-translating mechanism between eccentric pin 28 and pinion 20 is conventional and hence may be omitted herein for ease of illustration. The tubular reciprocating shaft 25 is illustrated herein as having a square cross-section (see FIGURE 5); however, it will be appreciated, of course, that the shaft 25 may have any desired cross-section, just as long as it is hollow or tubular in nature. Moreover, the shaft 25 is journaled within the gear case 13 by means of suitable square bearings 29 and 30. This latter bearing (30) is positioned adjacent to the rearmost portion 44 of gear case 13; and a washer 47 (made of rubber, felt or other suitable material) is interposed between bearing 30 and the underside of a concentric bearing boss 34, the latter being noted hereinafter in further detail. Means may also be provided (indicated generally at 31 in FIGURES 3 and 4) for mounting the blade 15 upon the shaft 25 as described in the co-pending Atkinson et al. application, Serial No. 61,916, filed October 11, 1960, and assigned to the same assignee as the present invention.

With particular reference to FIGURE 5, there is illustrated the rearmost portion 44 of the gear case 13, which has a plurality of mounting bosses 32 circumferentially-spaced around the periphery thereof. A corresponding plurality of circumferentially-spaced threaded recesses 33 are located in the motor housing 11 (one of which is illustrated in FIGURE 2) such that the gear case 13 may be secured to the motor housing 11. Moreover, the rearmost portion of the gear case 13 includes a concentric bearing boss 34 (see FIGURES 4 and 5), and a plurality of circumferentially-spaced radially-projecting ribs 35 (see FIGURES 5 and 6) emanate from the boss 34 within the rearmost portion 44 of the gear case 13.

With reference to FIGURES 5, 6, 7, and 8, it will be noted that one of the ribs, denoted by the numeral 36, is lower than the other of the ribs 34 so as to define (in the rearmost portion 44 of the gear case 13) the entrance of an air scoop 37 (see FIGURE 5), by means of which a portion of the normally-discharged air is diverted down through the tubular reciprocating shaft 25. The air scoop 37 is allowed to communicate with the rearmost open end 38 of the tubular reciprocating shaft 25 by means of an opening 39 (see FIGURES 4, 5, and 8) which is formed in the rearmost portion 44 of gear case 13. The air scoop 37 terminates at opening 39 in the rearmost portion 44 of the gear case 13, and a U-shaped baffle 40 is formed exteriorly of the rearmost portion 44 of the gear case 13 and surrounds a portion of the air scoop 37. The baffle 40 is located between two of the mounting bosses 32 along the periphery of the gear case 13 (see FIGURE 5); and the remainder of the periphery of the gear case 13 has a plurality of arcuate recesses 45 (one each located between adjoining mounting bosses 32) so as to comprise the aforementioned air discharge openings 24 between the motor housing 11 and the gear case 13. The U-shaped baffle 40 has a trough 41 surrounding the opening 39 in the rearmost portion 44 of the gear case 13, and the baffle 40 further has a pair of legs 42 and 43 emanating therefrom. One of the legs (42) terminates at one of the mounting bosses 32, while the other of the legs (43) of baffle 40 terminates at the concentric bearing boss 34 adjacent to the lowermost rib 36 and substantially tangential to the innermost portion of the bearing boss 34.

In such a manner, it will be appreciated that the baffle 40 and the lowermost rib 36 define therebetween the air scoop 37 formed in the rearmost portion 44 of the gear case 13, and that the air scoop 37 communicates with the tubular reciprocating shaft 25 by means of the opening 39 (formed in the rearmost portion 44 of the gear case 13) in conjunction with the rearmost open end 38 of shaft 25.

Hence, a portion of the air which is normally discharged through the openings 24 is thus diverted down through the tubular reciprocating shaft 25; and the result is threefold: one, the chips and dust particles are blown away from the kerf of the saw blade 15, as shown in FIGURE 3, and hence do not obscure the vision of the operator; two, a degree of cooling air is provided for the shaft 25 and yoke 26; and three, chips and dust particles are precluded from entering the tubular reciprocating shaft 25 and thus otherwise clogging the mechanism.

As shown more concisely in FIGURE 4, the baffle 40 has a slight amount of clearance (in the order of $\frac{1}{32}$ of an inch) with respect to the forwardmost portion of the motor housing 11; the purpose of this clearance is to accommodate normal manufacturing tolerances in die-cast aluminum housings, and it will be appreciated that this very slight clearance does not have any deleterious effect upon the overall means to divert a portion of the normally-discharged air down through the tubular reciprocating shaft 25. Moreover, it will be further appreciated that a greater (or a lesser) proportion of the normally-discharged air may be passed down through the shaft 25 by the simple expedient of including additional baffles and/or air scoops, if desired; and consequently, the scope of the present invention is not necessarily to be confined to the specific embodiment herein illustrated.

Obviously, many modifications may be made without departing from the spirit of the present invention; therefore, within the scope of the appended claims, the invention may be practiced other than has been specifically described.

I claim:
1. In a reciprocating saw, the combination of a motor housing having a plurality of rearwardly-disposed air inlet openings, a motor in said motor housing, a gear case secured forwardly of said motor housing and in substantial longitudinal alignment therewith, said gear case having a rearward closed portion including a bearing boss, a bearing retained in said boss, said motor having an armature shaft journaled in said bearing and protruding into said gear case, a hollow shaft journaled in said gear case, said hollow shaft being disposed parallel to said armature shaft, bearing means to journal said hollow shaft in said gear case, motion-translating means interconnecting said armature shaft and said hollow shaft to reciprocate said hollow shaft in said gear case, a cutting tool secured to said hollow shaft and projecting forwardly of said gear case, a fan mounted on said armature shaft intermediate said bearing boss and said motor, said motor housing and said gear case having circumferentially-spaced air discharge openings therebetween, said rearward portion of said gear case having an opening disposed radially of said bearing boss and in comunication with said hollow shaft, and said rearward portion of said gear case further having an air scoop formed therein between said bearing boss and said opening to divert a portion of the air normally discharged through said air discharge openings down through said hollow shaft, whereby an air stream is provided to blow away the chips and dust particles created by said cutting tool.

2. The combination according to claim 1, wherein said rearward portion of said gear case has a periphery which is provided with a plurality of mounting bosses circumferentially-spaced around said periphery, said motor housing having a forward portion which is provided with a corresponding plurality of circumferentially-spaced threaded recesses, fastening means cooperating with said bosses and recesses to secure the gear case to said motor housing, and the arcuate spaces intermediate said mounting bosses comprising said air discharge openings.

3. The combination according to claim 2, wherein said bearing boss is formed concentrically of said rearward portion of said gear case, and wherein said rearward portion of said gear case is provided with a plurality of circumferentially-spaced radially-projecting ribs, each of said ribs being disposed between said bearing boss and a respective one of said mounting bosses.

4. The combination according to claim 3, wherein one of said ribs is shorter than the other of said ribs, and wherein said rearward portion of said gear case is provided with a U-shaped baffle, said baffle including a trough and further including a pair of legs emanating from said trough, said trough being radially adjacent to said opening in said rearward portion of said gear case, one of said legs of said baffle being substantially tangential to said bearing boss, and the other of said legs of said baffle terminating at the respective one of said mounting bosses to which said shorter rib terminates.

References Cited in the file of this patent
UNITED STATES PATENTS

| 1,959,199 | Cross | May 15, 1934 |
| 2,639,737 | Forsberg | May 26, 1953 |
| 2,794,459 | Hosford et al. | June 4, 1957 |
| 2,822,005 | Lee et al. | Feb. 4, 1958 |
| 2,866,485 | Anton | Dec. 30, 1958 |

FOREIGN PATENTS

| 778,019 | Great Britain | July 3, 1957 |